J. J. STENSGARD.
AUTOMOBILE KNUCKLE.
APPLICATION FILED NOV. 5, 1919.
1,355,709.
Patented Oct. 12, 1920.
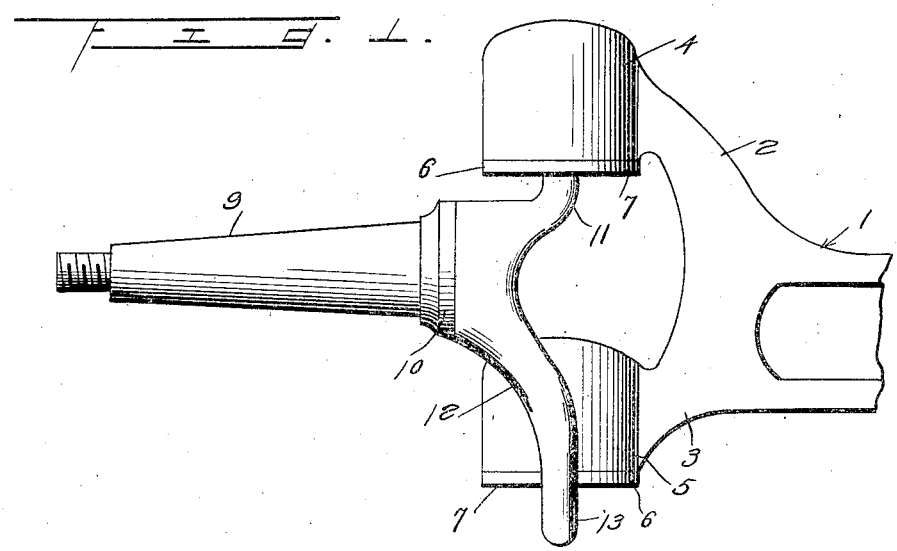
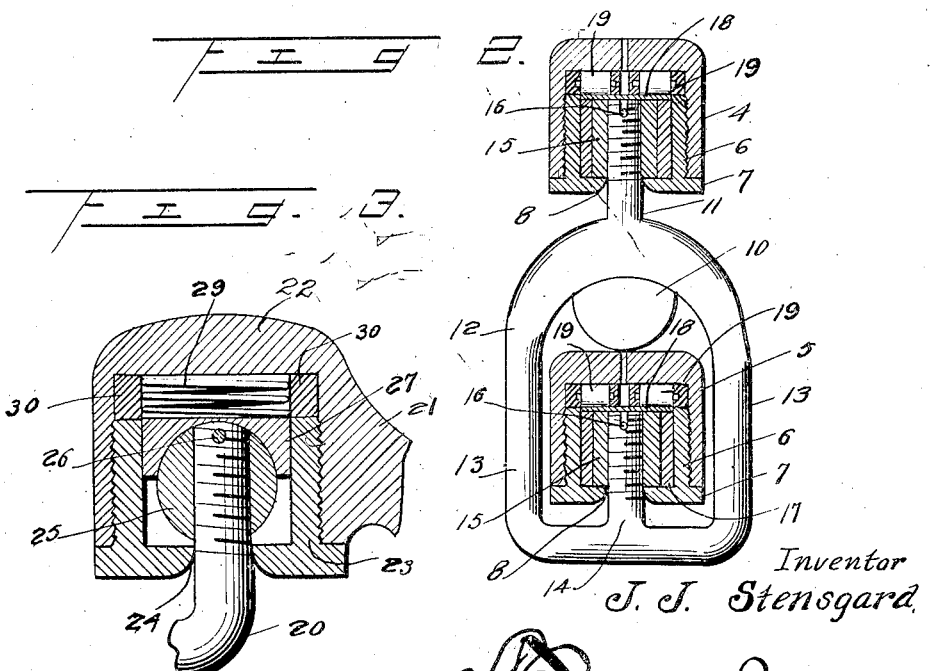
Inventor
J. J. Stensgard
By [signature], Attorney

UNITED STATES PATENT OFFICE.

JULIUS J. STENSGARD, OF WOODVILLE, WISCONSIN.

AUTOMOBILE-KNUCKLE.

1,355,709.  Specification of Letters Patent.  Patented Oct. 12, 1920.

Application filed November 5, 1919. Serial No. 335,893.

*To all whom it may concern:*

Be it known that I, JULIUS J. STENSGARD, a citizen of the United States, residing at Woodville, in the county of St. Croix and State of Wisconsin, have invented certain new and useful Improvements in Automobile-Knuckles; and I do hereby declare the following to be a full, clear, and exact description of the invention, such as will enable others skilled in the art to which it appertains to make and use the same.

This invention relates to new and useful improvements in automobile knuckles of the character described, claimed and illustrated in my United States Patent #1,302,989, and has for one of its objects the provision of means whereby the spindle of the steering knuckle can be brought in closer proximity to the axle and which will also render a more substantial structure.

Another object of this invention is the provision of a ball and anti-rattle means to be used between two movable parts so that said parts may be free to have their desired movement without any undue friction and noise.

With these and other objects in view as will become more apparent as the description proceeds, the invention consists in certain novel features of construction, combination, and arrangement of parts, as will be hereinafter more fully described and claimed.

For a complete understanding of my invention, reference is to be had to the following description and accompanying drawing, in which:—

Figure 1 is a side elevation of an automobile knuckle constructed in accordance with my invention, Fig. 2 is a sectional view of the same, illustrating the shape of the lower arm, Fig. 3 is an enlarged sectional view of the bearing member with the ball arranged therein.

Referring in detail to the drawing, the numeral 1 indicates an axle having at its ends, the spaced arms 2 and 3 on which are formed bearing members 4 and 5. The bearing members 4 and 5 are closed at their upper ends while their lower ends are open to receive retaining sleeves 6. The retaining sleeves are threaded into the bearing members 4 and 5 and have formed thereon plates 7 provided with openings 8. The plates 7 project beyond the sleeves 6 to form overlying flanges adapted to abut the lower edges of the bearing members 4 and 5. The spindle 9 has formed upon its inner end a head 10 on which is formed an arm 11. The arm 11 extends inwardly and upwardly within the bearing member 4 by way of the opening 8. The head 10 also has formed thereon an arm 12, which arm is bifurcated to form spaced portions 13 that extend inwardly and downwardly on each side of the bearing member 5. The spaced portions at their lower ends are joined together and disposed vertically to form an arm 14. The end of the arm 11 and the end of the arm 14 are screw threaded and have threaded thereon bearing sleeves 15. The ends of said arms are provided with slots that receive pins 16 that extend through slots or openings in the bearing sleeves 15 for locking the sleeves to their respective arms. Bushings 17 are interposed between the retaining sleeves and the bearing sleeves and are retained in their proper position by resting on the plates 7. A wear plate 18 is positioned upon the upper ends of the bushings and sleeves and have mounted thereon thrust rollers 19. The thrust rollers 19 are located between the wear plate 18 and the bearing members for taking up end thrust of the device.

Referring to Fig. 3 in which I have shown a modified form of bearing member adapted to connect a pair of rods or arms 20 and 21 together, the arm 21 may be the arm to the steering knuckle, while the arm 20 may be the connecting rod between a pair of arms of a pair of steering knuckles to an automobile.

The arm 21 has formed thereon a bearing member 22 having its upper end closed while its lower end is fully open. The bearing member is internally screw threaded to receive a retaining sleeve 23. The retaining sleeve 23 is provided with an opening in its plate 24 to permit the arm 20 to extend upwardly within said sleeve and bearing member. The end of the arm 20 is provided with screw threads for coöperation with internal screw threads formed on a ball or sphere 25. The ball or sphere 25 is provided with an opening to receive a pin 26 that extends through an opening in the arm whereby the ball or sphere is locked to the arm. A sectional bushing 27 is located within the sleeve and bearing member and consists of a pair of sections provided with semi-circular recesses to receive the ball or sphere. A spring 29 is interposed between the bushing and the top wall of the bearing member 22 for the purpose of taking up end thrust to the device and also to prevent any undue noise caused by rattling of loose parts. The spring 29 is confined within an annular member or ring 30 located within the bearing member 22 and supported therein by the retaining sleeve 23.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. An automobile knuckle including an axle and a spindle head, spaced bearing members formed on the axle, a vertically disposed arm formed on the upper portion of the spindle head and received by the upper bearing member, a second arm formed on the lower portion of the spindle head and bifurcated to straddle the lower bearing member and having the ends thereof formed onto each other, and a vertically disposed arm formed on the connecting ends of the bifurcated arm and received by the lower member.

2. An automobile knuckle including a pair of arms, a bearing member formed on one of said arms, a ball secured to the other of said arms, sectional bushings arranged within the bearing member and receiving the ball, means securing the bushings within the bearing member, a pin locking the ball to the arm, and a spring interposed between the bearing member and the bushings.

In testimony whereof I affix my signature in presence of two witnesses.

JULIUS J. STENSGARD.

Witnesses:
SIGURD C. NELSON,
CARL E. ANDERSON.